US011693555B1

(12) United States Patent
Pachaury

(10) Patent No.: US 11,693,555 B1
(45) Date of Patent: Jul. 4, 2023

(54) PRESSURE VALUE SIMULATION FROM CONTACT AREA DATA

(71) Applicant: Adobe Inc., San Jose, CA (US)

(72) Inventor: Shruti Pachaury, Ghaizabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/574,247

(22) Filed: Jan. 12, 2022

(51) Int. Cl.
*G06F 3/04883* (2022.01)
*G06T 11/60* (2006.01)
*G06F 3/04845* (2022.01)

(52) U.S. Cl.
CPC ...... *G06F 3/04883* (2013.01); *G06F 3/04845* (2013.01); *G06T 11/60* (2013.01)

(58) Field of Classification Search
CPC .............. G06F 3/04883; G06F 3/0488; G06F 3/04845; G06T 11/60
USPC ........................................................ 715/863
See application file for complete search history.

(56) References Cited

U.S. PATENT DOCUMENTS

| 2011/0205169 | A1* | 8/2011 | Yasutake | G06F 3/04883 345/173 |
| 2014/0210742 | A1* | 7/2014 | Delattre | G06F 3/0414 345/173 |
| 2014/0320460 | A1* | 10/2014 | Johansson | G06F 3/0421 345/175 |
| 2015/0160779 | A1* | 6/2015 | Huang | G06F 3/0488 345/173 |
| 2015/0261330 | A1* | 9/2015 | Jalali | G06F 3/04847 345/173 |
| 2016/0004380 | A1* | 1/2016 | Kim | G06F 3/04186 345/174 |
| 2016/0132139 | A1* | 5/2016 | Du | G06F 3/0414 345/173 |
| 2017/0010732 | A1* | 1/2017 | Bosch Ruiz | G06F 3/0412 |
| 2018/0121081 | A1* | 5/2018 | Barsness | G06F 3/0418 |
| 2022/0334716 | A1* | 10/2022 | Zou | G06F 3/04886 |

FOREIGN PATENT DOCUMENTS

WO    WO-2019169583 A1 *  9/2019

OTHER PUBLICATIONS

IPCOM000209536D, "A method to implement pressure-sensitive control by measuring the touch area of finger on the screen", published on Aug. 9, 2011 (Year: 2011).*
Kin et al., "Proton++: A Customizable Declarative Multitouch Framework", UIST'12, Oct. 7-10, 2012 (Year: 2012).*

* cited by examiner

*Primary Examiner* — Reza Nabi
*Assistant Examiner* — Hwei-Min Lu
(74) *Attorney, Agent, or Firm* — FIG. 1 Patents

(57) ABSTRACT

Pressure value simulation techniques from contact area data detected using a sensor are described. In an implementation, contact area data is received that describes an amount of contact detected at a surface of a touchscreen device, e.g., as a radius. The contact area data is translated into a pressure value defining an amount of pressure. An editing operation is generated to edit a digital image based the amount of pressure defined by the pressure value. The digital image is displayed by a display device as having the applied editing operation.

20 Claims, 6 Drawing Sheets

PRESSURE VALUE SIMULATION FROM CONTACT AREA DATA

BACKGROUND

Touch detection has been utilized to expand the ways, in which, users interact with the computing devices. In a mobile configuration, for instance, computing devices typically employ a touchscreen that is configured to detect contact at a surface of the touchscreen. This supports an appearance of direct interaction with respective portions of a user interface displayed by the touchscreen, e.g., to press a button, move a slider, and so forth. Other examples include touchpads often found in laptops or as dedicated input devices for desktop computers that also support touch interaction, e.g., to input gestures, navigate through a user interface output by the computing device, and so on.

As such, contact with computing devices is implemented in a variety of computing device configurations, and is also implemented in a variety of ways by these configurations. Because of this, technical challenges arise in addressing these different configurations as part of operation of the computing device. An example of this involves the use of pressure. In some instances, a computing device employs an active implement (e.g., an active stylus) that is external of the computing device. The active implement is used to communicate pressure values back to the computing device upon contact with a surface of the computing device. However, inactive implements (e.g., a user's finger or other parts of a human body) that do not include these sensors are not capable in conventional configurations to support input of these values. As such, corresponding functionality of the computing device controlled using pressure values is not available, thereby limiting operation and operational efficiency of the computing device as well as user interaction with the device.

SUMMARY

Pressure value simulation techniques are described that simulate pressure values from contact area data. In an implementation, contact area data is received that describes an amount of contact detected at a surface of a touchscreen device, e.g., as a radius. The contact area data is translated into a pressure value defining an amount of pressure. An editing operation is generated to edit a digital image based the amount of pressure defined by the pressure value. The digital image is displayed by a display device as having the applied editing operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
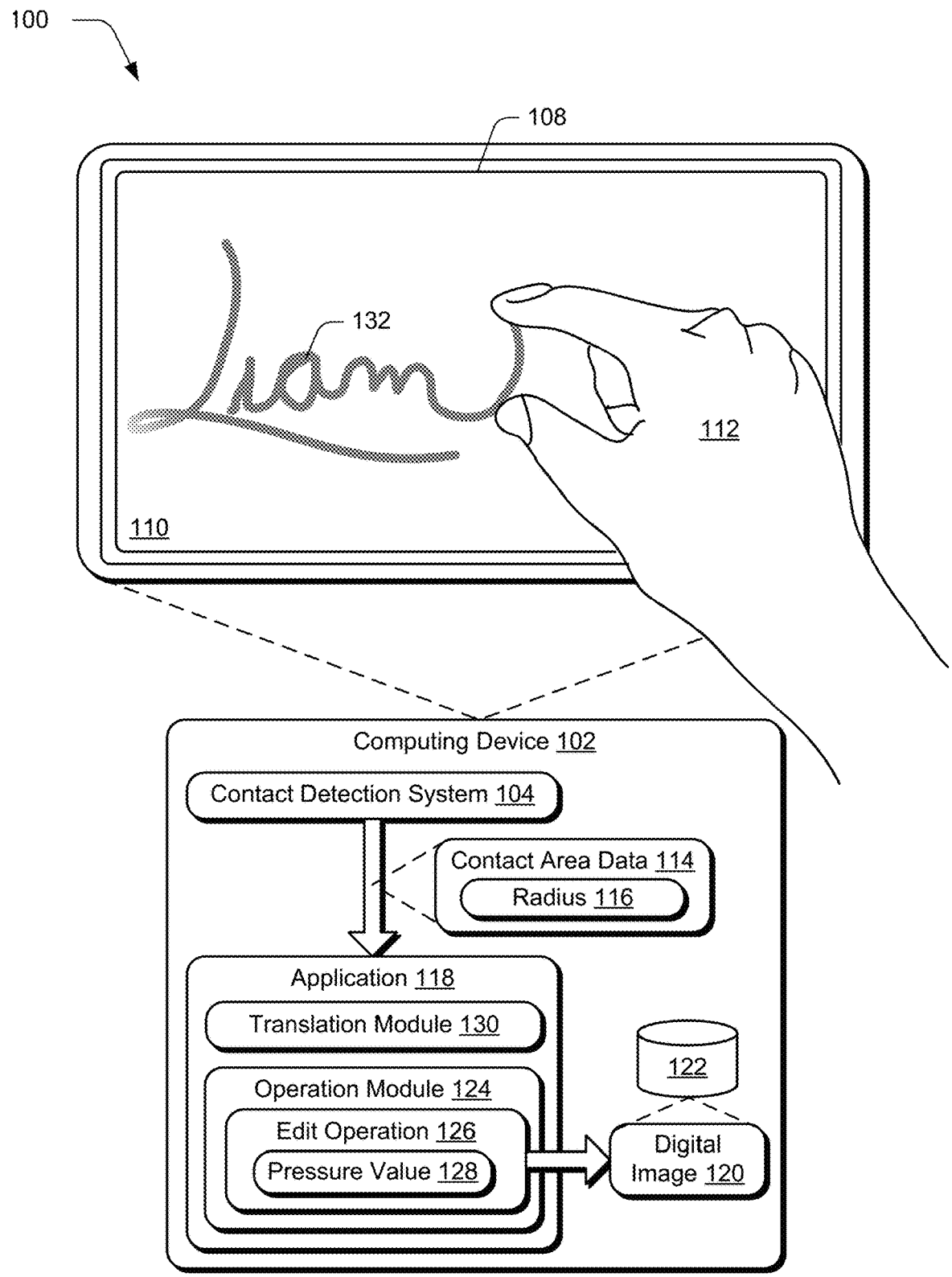
FIG. 1 is an illustration of an environment in an example implementation that is operable to employ pressure value simulation techniques described herein.

Techniques utilized to support touch interaction between a user and a computing device are implemented in a variety of ways across a variety of devices and may even change by those same devices over time. An example of this involves techniques used to detect pressure in which an active stylus is developed that uses dedicated pressure sensors included within the stylus to communicate pressure values back to a computing device. Therefore, techniques used to contact the computing device that do not have these sensors (e.g., an inactive stylus such as an appendage of a user) are incapable of implementing functionality that relies on pressure values.

Accordingly, contact to pressure value translation techniques are described that are usable to simulate pressure values by detecting contact that does not directly indicate amounts of pressure. In this way, the techniques described herein overcome conventional technical challenges by supporting use of pressure values by computing devices and associated hardware that do not include conventional dedicated hardware and functionality.

In an example, a computing device includes a contact detection system that is configured to generate contact area data using a sensor. The sensor, for instance, is configurable as part of a touchscreen device, examples of which include resistive, optical imaging, surface capacitive, projected capacitive, infrared, surface acoustic wave, and other types of sensors. Other examples are also contemplated, such as sensor incorporated as part of a dedicated standalone device, e.g., a touchpad.

The contact detection system is configured to output values via respective application programming interfaces (APIs) based on data that is detectable as part of the contact. In an instance in which the contact is performed using an active implement (e.g., active stylus), the contact data indicates a location, at which, the contact is detected (e.g., with respect to a surface) and pressure values from the stylus. In an instance in which the contact is performed using an inactive implement (e.g., a finger of a user's hand), the contact data includes a location but does not include the pressure values as this information is not available.

Accordingly, an application is configured in this example to first detect a type of contact, and from this, enter a respective mode based on data made available to the application. Continuing with the above example, if the contact is detected from an active implement (i.e., active stylus), the application obtains pressure values generated by the active implement itself using a "direct mode" via respective application programming interfaces of the contact detection system. On the other hand, in an instance in which pressure values and/or an active implement is not also detected or corresponding data is not made available via a corresponding API, the application enters a "simulation mode" using a translation module to simulate pressure values based on data that is available from respective APIs of the contact detection system.

To do so, the application obtains contact area data via an API that describes an amount of area that corresponds to the contact detected by the contact detection system. In an implementation, the contact area data describes a radius of the contact area. Therefore, in an instance in which a contact is received using an inactive implement (e.g., a finger, conventional pencil, or other contact device), the application accesses a respective API to obtain the contact area data as a discrete value within a defined range, e.g., ten to sixty.

A translation module of the application then maps the discrete values of the contact area data to pressure values indicative of relative amounts of pressure, e.g., from zero to one. In one example, a bucketized strategy is utilized in which intervals of values of contact area data are mapped to a respective pressure value defined based on a respective bucket. Contact area data indicating a radius of less than twenty-one, for instance, is mapped to a pressure value of "0.25." Likewise, contact area data indicating a radius of greater than twenty-one and less than thirty-one is mapped to a pressure value of "0.40" and contact area data indicating a radius of greater than thirty-one and less than forty-one is mapped to a pressure value of "0.54." Contact area data indicating a radius of greater than forty-one and less than fifty-one is mapped to a pressure value of "0.80" and contact area data indicating a radius of greater than fifty-one and less than sixty-one is mapped to a pressure value of "1." Other examples are also contemplated that do not employ buckets to map values indicating an amount of contact to values indicating amounts of pressure.

A counter and delta values are also usable by the translation module as part of the mapping by the translation module to stabilize changes and reduce "jitter" by smoothing pressure values between successive iterations output by the module. The translation module, for instance, is configured to map the contact area data to pressure values over successive iterations, e.g., as part of a single continuous input. Delta values are defined that specify addition amounts added to the pressure values as changes in the amount of contact area are detected. Similar techniques are also usable in which the counter is used to track iterations such that increases past a threshold number of iterations (e.g., five) are maintained at a current pressure value. In other words, a condition is utilized by the translation module at which a respective pressure value is set and prevented from further changes.

The pressure values translated by the translation module are then output to for use in a variety of operations executed by the computing device. In one example, the pressure values are used to generate edit operations to digital images. The edit operations, for instance, are defined to be performed to a particular amount (i.e., degree) based on an amount of pressure defined by the pressure values. Examples of edit operations in a digital image editing scenario include line thickness, opacity, gradient, color, and so on. Other digital content editing operations are also contemplated, such as to control acoustic characteristics used in digital audio. In this way, the translation techniques used to simulate pressure values overcome conventional technical challenges to make functionality that leverages pressure values available in a wide range of usage scenarios. Further discussion of these and other examples is included in the following section and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ pressure value simulation techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices as described in FIG. 6.

The computing device 102 includes a contact detection system 104 that is configured to detect contact at a surface, e.g., with a surface of a touchscreen of a display device 108. The display device 108, for instance, outputs a user interface 110 that supports user interaction with elements displayed by the UI, e.g., via contact of a user's hand 112 detected as proximal to a surface of the display device 108. Other examples are also contemplated, including contact with a touchpad device that is incorporated as part of a laptop computer, a standalone peripheral device, and so forth.

The contact detection system 104 is configured to exposed contact area data 114 that describes characteristics of this contact, such as an amount of contact detected. The amount of contact is expressible in a variety of ways, an example of which is a radius 116. Other examples are also contemplated, e.g., a contact area, a number of pixels using sensor-in-pixel technology, and so forth.

An application 118 is configured in this example to leverage the contact area data 114, e.g., to edit a digital image 120 depicted as maintained in a storage device 122. An operation module 124, for instance, is configured to generate an edit operation 126 having a defined amount (i.e., degree) to which the operation is performed based on an amount of pressure indicated by a pressure value 128. However, as previously described in some computing device configurations the pressure value 128 is not available, such as for a contact detection system 104 that relies on an active implement to communicate the pressure values and as such is not available for contact detected for a finger of the user's hand 112.

Accordingly, the application 118 includes a translation module 130 that is configured to translate the contact area data 114 into the pressure value 128. In this way, execution of the edit operation 126 is possible in usage scenarios that are not possible in conventional implementations due to reliance on physical pressure sensors 208. In the illustrated example, a single continuous user input is illustrated as drawing a single continuous line 132 "Liam" in the user interface 110. The edit operation 126 is depicted as varying a gradient used to output respective portions of the line based on pressure values 128 that are simulated for the contact caused by different amounts of contact of the finger of the user's hand 112 at corresponding points in the user interface 110. In this way, the translation module 130 is configured to simulate the pressure value 128 based on an amount of contact defined by contact area data 114. A variety of other examples are also contemplated, further discussion of which is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Pressure Value Simulation from Contact Area Data

The following discussion describes pressure value simulation techniques that are implementable utilizing the previously described systems and devices. Aspects of the procedure is implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-5.

Figure 2:
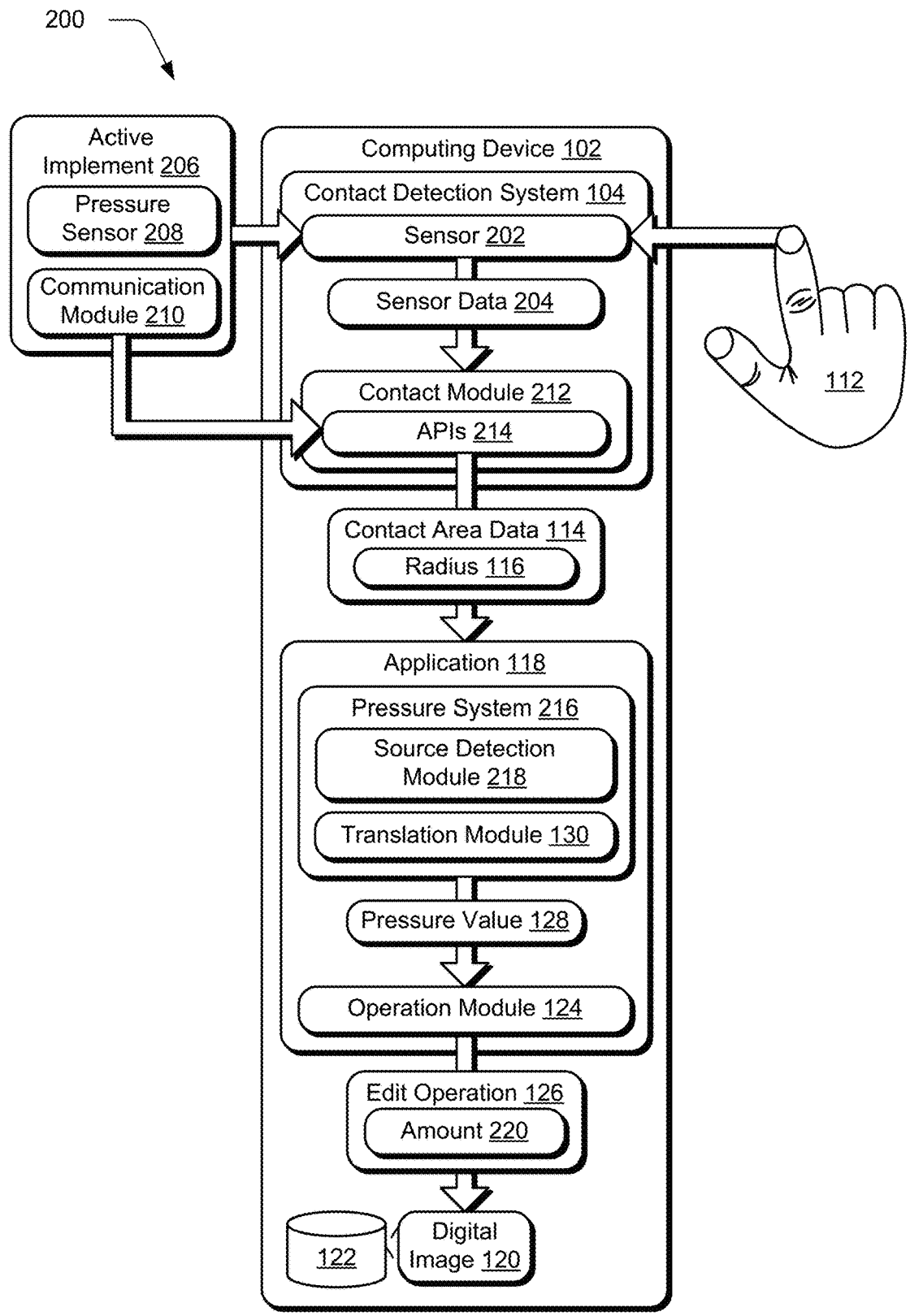
FIG. 2 depicts a system in an example implementation showing operation of a contact detection system and translation module of an application.
Figure 5:
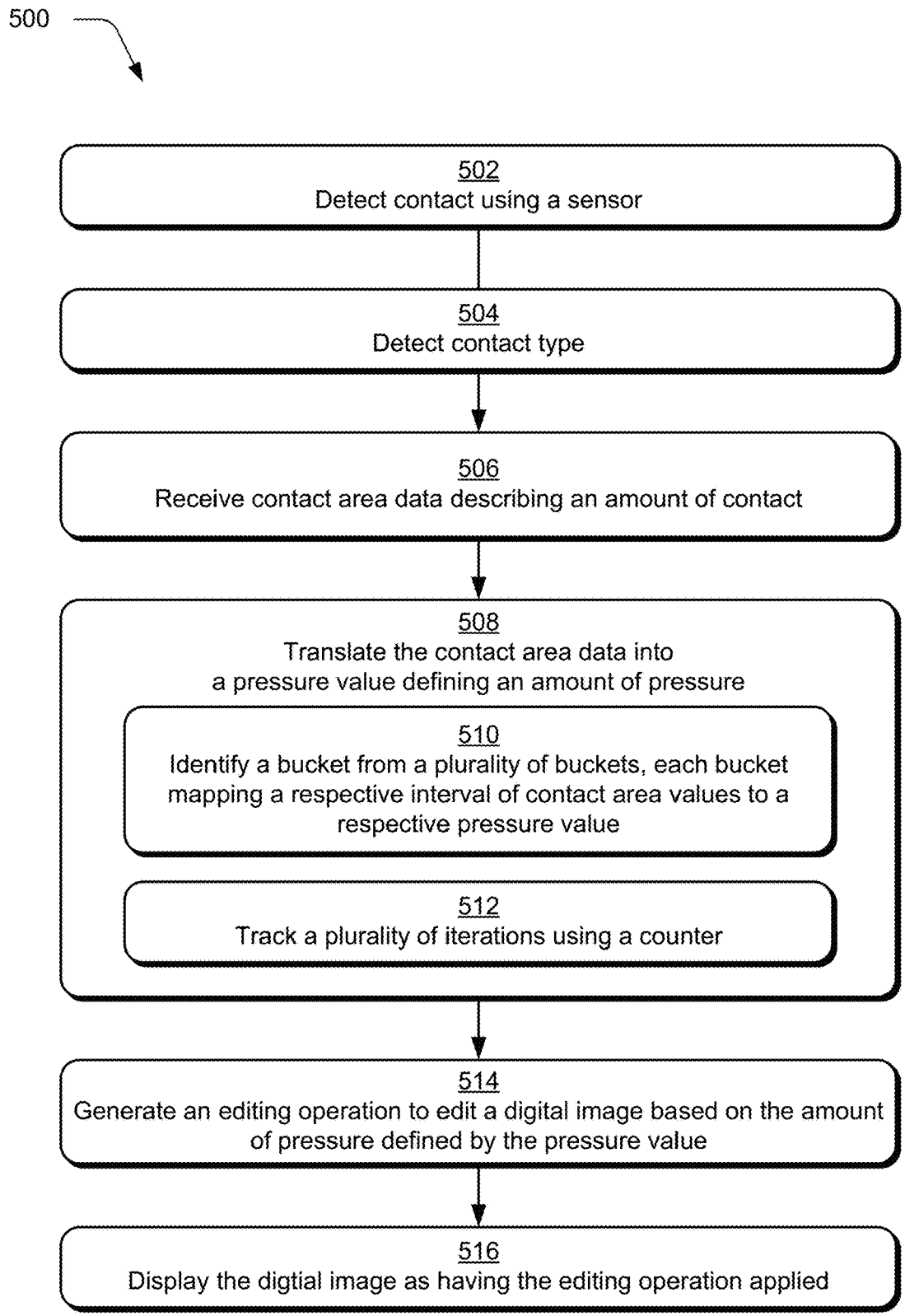
FIG. 5 is a flow diagram depicting a procedure in an example implementation of pressure value simulation.

FIG. 2 depicts a system 200 in an example implementation showing operation of the contact detection system 104 and the application 118 in greater detail as part of simulating pressure values based on contact area data 114. FIG. 5 depicts a procedure 500 describing operations performable by the system 200 of FIG. 2 to translate contact area data into pressure values which is described in parallel with the other figures.

To begin in this example, contact is detected using a sensor 202 (block 502). The sensor 202 is configured to detect contact at a surface, e.g., a touchscreen device, touchpad, and so forth, and may also detect a location of this contact. A result of this detection is output by the sensor 202 as sensor data 204. Examples of sensor 202 configurations include resistive, optical imaging, surface capacitive, projected capacitive, infrared, surface acoustic wave, and any other type of sensor that is configured to detect contact and/or proximity to a surface.

In the illustrated example of FIG. 2, the contact detection system 104 is configured to communicate with an active implement 206, e.g., an active stylus. The active implement 206 includes a housing, in which, a pressure sensor 208 is disposed internal (at least partially) and used to detect amounts of pressure exerted by the active implement 206 against a surface. A communication module 210 is also disposed in the housing to communicate pressure values describing the amounts that are detected by the pressure sensor 208 to the contact detection system 104, e.g., via a wireless connection.

A contact module 212 is employed to expose this data, when available, via respective application programming interfaces (APIs) 214. In an instance in which contact involves an active implement 206, respective APIs 214 expose location data indicating "where" the contact occurred as detected by the sensor 202 and pressure values received by the communication module 210 as generated by the pressure sensor 208.

In another instance, the implement is inactive and as such does not include a pressure sensor 208. An example of an inactive implement is depicted as a finger of a user's hand 112 although other examples are also contemplated, e.g., a conventional pencil. The contact module 212 exposes contact area data 114, via respective APIs 214, describing an amount of contact detected by the sensor 202. The amount of contact is describable by the contact area data 114 in a variety of ways. In the illustrated example, the contact area data 114 indicates the amount of contact as a radius 116, e.g., defined as two extremes in contact points detected by the sensor 202 for a contact area. Other examples are also contemplated, such as to indicate an area (e.g., a number of pixels) contacted in a sensor-in-pixel scenario, area within a border defined by the contact, and so forth.

The application 118 is configured to dynamically configure functionality based on which information is available via respective APIs 214 of the contact detection system 104. To do so, the application 118 includes a pressure system 216 that is configured to output pressure values 128 to support these different scenarios.

The pressure system 216, for instance, first detects a contact type (block 504). The contact type is definable based on whether the contact is originated by an active implement 206 or an inactive implement (e.g., the finger of a user's hand 112) using a source detection module 218. In one example, this is determined based on data availability via respective APIs 214 of the contact module 212. For an active implement, data is available via the APIs 214 that describes a location at which the contact occurs via respective APIs 214 and pressure values from the active implement, itself. For an inactive implement, data is available via respective APIs 214 that describes the location, but not the pressure values.

Accordingly, in instances in which pressure values are not available via respective APIs 214 of the contact detection system 104, the source detection module 218 is configured to switch from a direct mode that is configured to use the pressure values directly to a simulation mode that is configured to simulate the pressure value 128 using a translation module 130.

In the illustrated example, contact area data 114 is received by the translation module 130 that describes an amount of contact (block 506) via respective APIs 214 by the pressure system 216 responsive to a determination that pressure values are not available. The translation module 130 is then employed to translate the contact area data 114 into a pressure value 128 defining an amount of pressure (block 508). In this way, the translation module 130 provides functionality to simulate pressure values in instances in which these values are otherwise not available.

Simulation of the pressure value 128 is performable in a variety of ways. In one example, the contact area data 114 defines a radius 116. The radius 116 is describable as an integer value that expands in multiples (e.g., of 10.45) and is proportional to a radius of a contact area in millimeters. The radius 116 is typically described as a value between ten and sixty. Pressure values 128 supported by the operation module 124, however, are typically defined by a value between zero and one. Accordingly, the translation module 130 is configured to translate values of the radius between ten and sixty to pressure values between zero and one, with a value of zero indicating no pressure and a value of one indicating maximum pressure. The translation module 130 is configured to simulate pressure as part of this translation using a variety of techniques, an example of which is described as follows.

Figure 3:
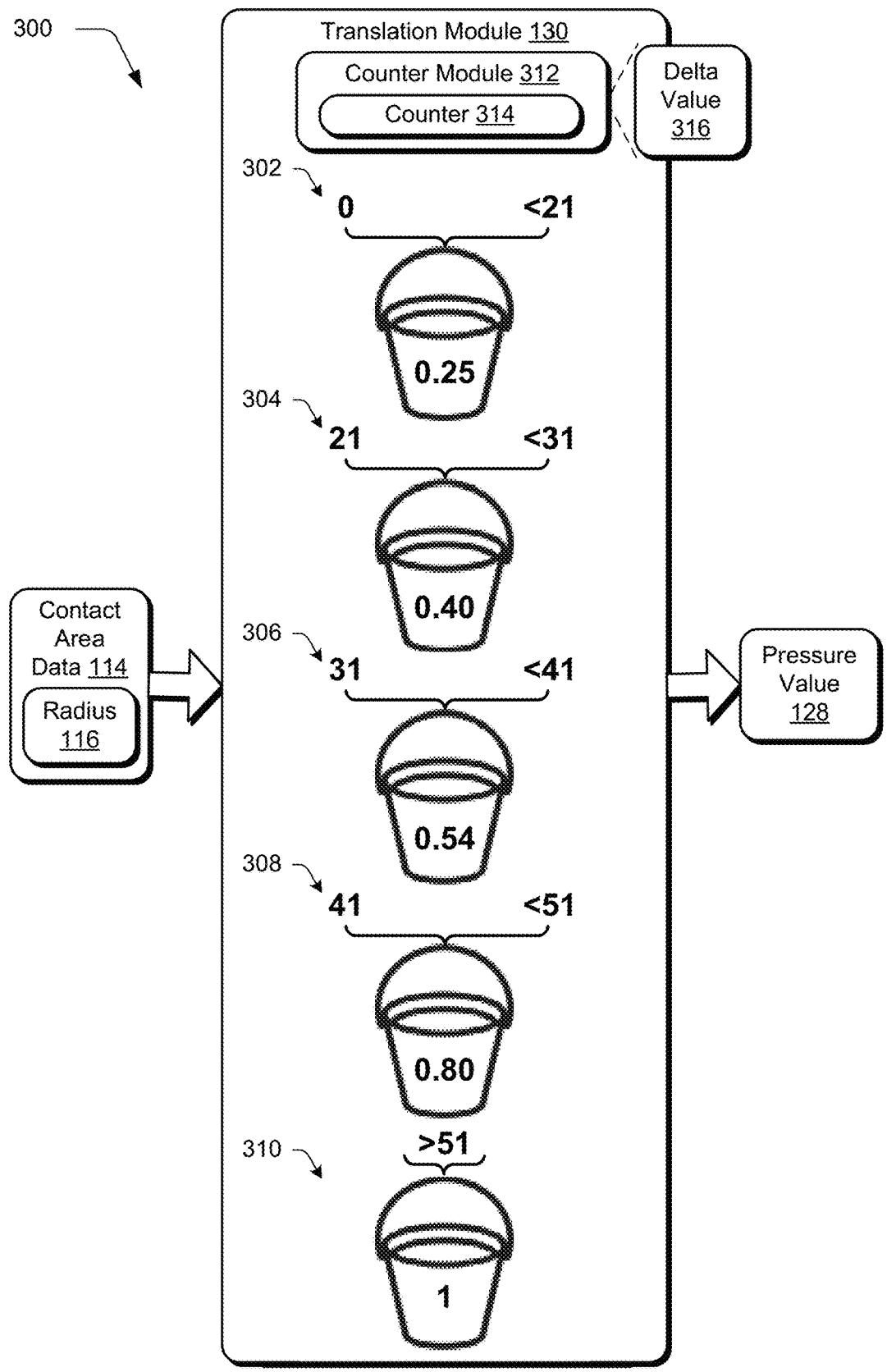
FIG. 3 depicts operation of the translation module of FIG. 2 in greater detail as employing a bucketized translation strategy.

FIG. 3 depicts an example 300 in which the translation module 130 employs a bucketized strategy to translate the contact area data 114 into a pressure value 128. The translation module 130, for instance, is configured to identify a bucket from a plurality of buckets. Each of the buckets is configured to map a respective interval of contact area values to a respective pressure value (block 510). Illustrated examples include a first bucket 302, second bucket 304, third bucket 306, fourth bucket 308, and fifth bucket 310.

Intervals of contact area data are illustrated above the respective buckets and respective pressure values assigned for those intervals are depicted on the bucket. These values have been determined through real-world evaluation. For the first bucket 302, contact area data indicating a radius of less than twenty-one is mapped to a pressure value of "0.25." For the second bucket 304, contact area data indicating a radius of greater than twenty-one and less than thirty-one is mapped to a pressure value of "0.40." For the third bucket 306, contact area data indicating a radius of greater than thirty-one and less than forty-one is mapped to a pressure value of "0.54." Likewise, for the fourth bucket 308 contact area data indicating a radius of greater than forty-one and less than fifty-one is mapped to a pressure value of "0.80" and for the fifth bucket 310 contact area data indicating a radius of greater than fifty-one and less than sixty-one is mapped to a pressure value of "1."

During real world evaluation, it was determined that conversion of contact area data 114 directly to a pressure value 128 can lead to abrupt changes. To address this, the translation module 130 is also configurable to include a counter module 312 that implements a counter 314 and a delta value 316 to control transitions between buckets through successive iterations of contact area data 114 and pressure value 128 translation.

Figure 4:
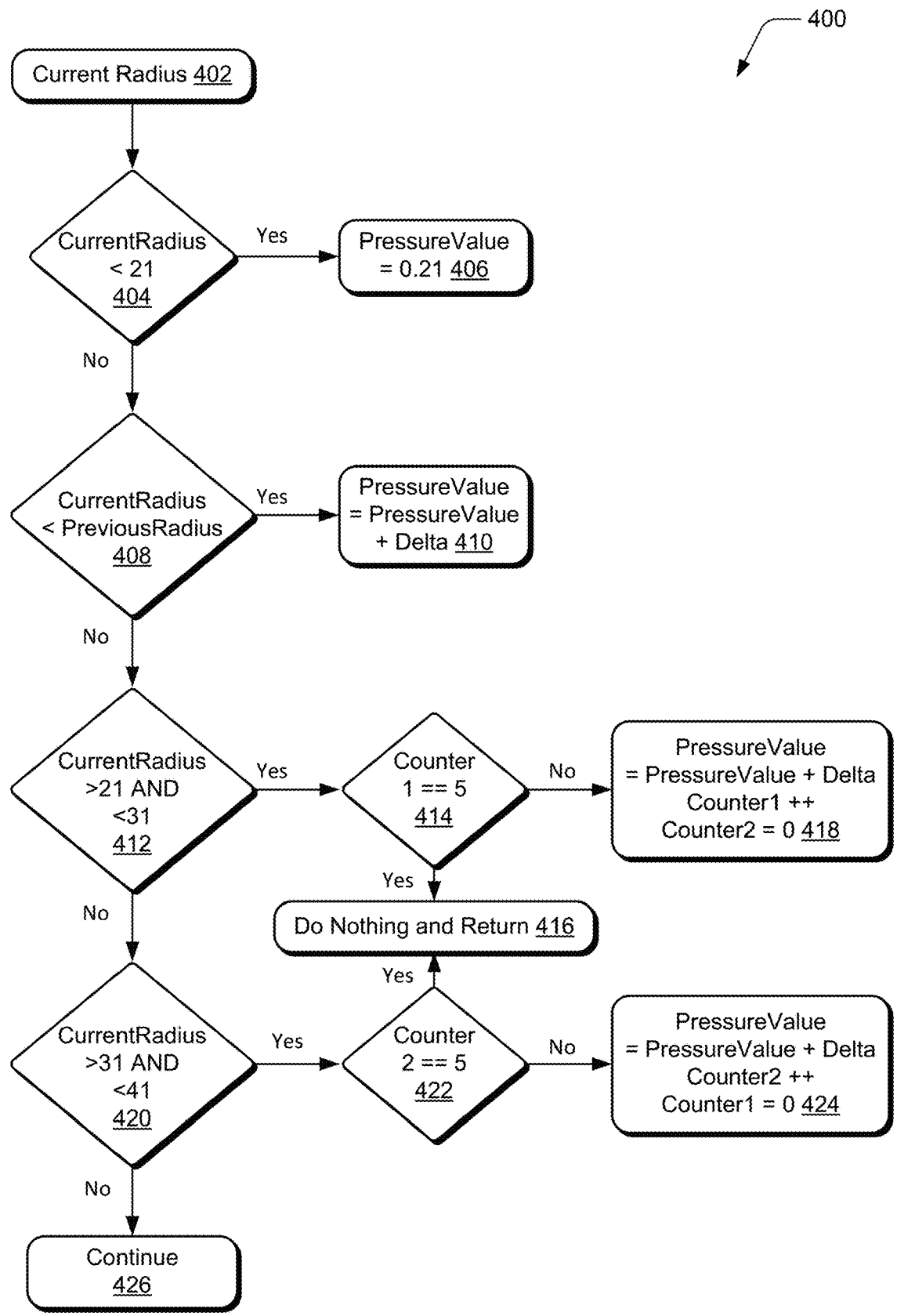
FIG. 4 depicts operation of the translation module to smooth pressure value translation using a counter and delta values.

FIG. 4 depicts an example procedure 400 involving operation of the buckets, counter, and delta value to control contact area data translation to pressure values by the translation module 130. The procedure 400 begins by receiving the contact area data 114 having a current radius at block 402. At decision block 404, a determination is made as to whether the current radius is less than twenty-one. If so ("yes" from decision block 404), the pressure value is set at "0.21" at block 406.

If not ("no" from decision block 404), a determination is then made by the translation module 130 at decision block 408 as to whether the current radius is less than a previous radius. This is performed such that when the radius is decreasing the pressure values are lowered gradually by the translation module 130, e.g., by a delta value, at block 410.

If so ("no" from decision block 408), a determination is made at decision block 412 as to whether the current radius is greater than twenty-one and less than thirty-one. If so ("yes" from decision block 412), the counter 314 is employed and a determination is made at decision block 414 as to whether the pressure values have increased five consecutive times. If so ("yes" from decision block 414), the pressure value remains constant at a current value at block 416 and the procedure returns. If not ("no" from decision block 414), the pressure value is set as the current pressure value with the delta value 316 added, e.g., incremented by "0.07," and the counter is also incremented at block 418.

If the current radius is not greater than twenty-one and less that thirty-one ("no" from decision block 408), a determination is made at decision block 420 as to whether the current radius is greater than thirty-one and less than forth-one. If so ("yes" from decision block 420), the counter 314 is again employed and a determination is made at decision block 422 as to whether the pressure values have increased a set number of consecutive times. If so ("yes" from decision block 422), the pressure value remains constant at a current value at block 416 and the procedure returns. If not ("no" from decision block 422), the pressure value is set as the current pressure value with the delta value 316 added, e.g., incremented by "0.07," and the counter is also incremented at block 424. This procedure continues at block 426 in a likewise manner for intervals of values greater than forty-one and less than fifty-one, and an interval defined for values greater than fifty-one as depicted in FIG. 3.

Therefore, in this example the translation module 130 employs to counter to track pressure values (block 512) and starts with a pressure value of 0.21, which approximates a pressure found while drawing using a stylus. The delta value of 0.07 (determined through experimentation) is added or subtracted at iterations each time a change is to be made to a current pressure value. This results in a gradual increase, e.g., in a drawing stroke pressure, to smooth the pressure values between iterations. This is used, for instance, as part of generating an editing operation to edit a digital image at an amount 220 based on the amount of pressure defined by the pressure value (block 514), e.g., to specify a degree to which a drawings stroke is widened, shaded, colored, etc. The digital image is then displayed as having the editing operation applied (block 516).

Three buckets of touch radius values are described in FIG. 4, and for each bucket the pressure value is gradually increased or decreased by the delta value based on whether a change occurs from a current bucket to another bucket between successive iterations. The counter 314 is maintained and reset accordingly. Thus, radius 116 is used to as a basis to simulate an amount of pressure, which is updated accordingly and "capped" at a value of 1. If the radius is decreased with respect to a previous iteration, that means pressure is decreasing, and therefore the pressure value is also decreased by the delta value. A threshold is also defined such that if the pressure is increased for a set number of times (e.g., five), the pressure value is fixed and remains constant for that single continuous input. In this way, the translation module 130 simulates pressure value and smooths output of those values between successive iterations. Other examples are also contemplated that do not employ buckets to map values indicating an amount of contact to values indicating amounts of pressure, e.g., employs a direct mapping between contact area data to pressure values.

Example System and Device

Figure 6:
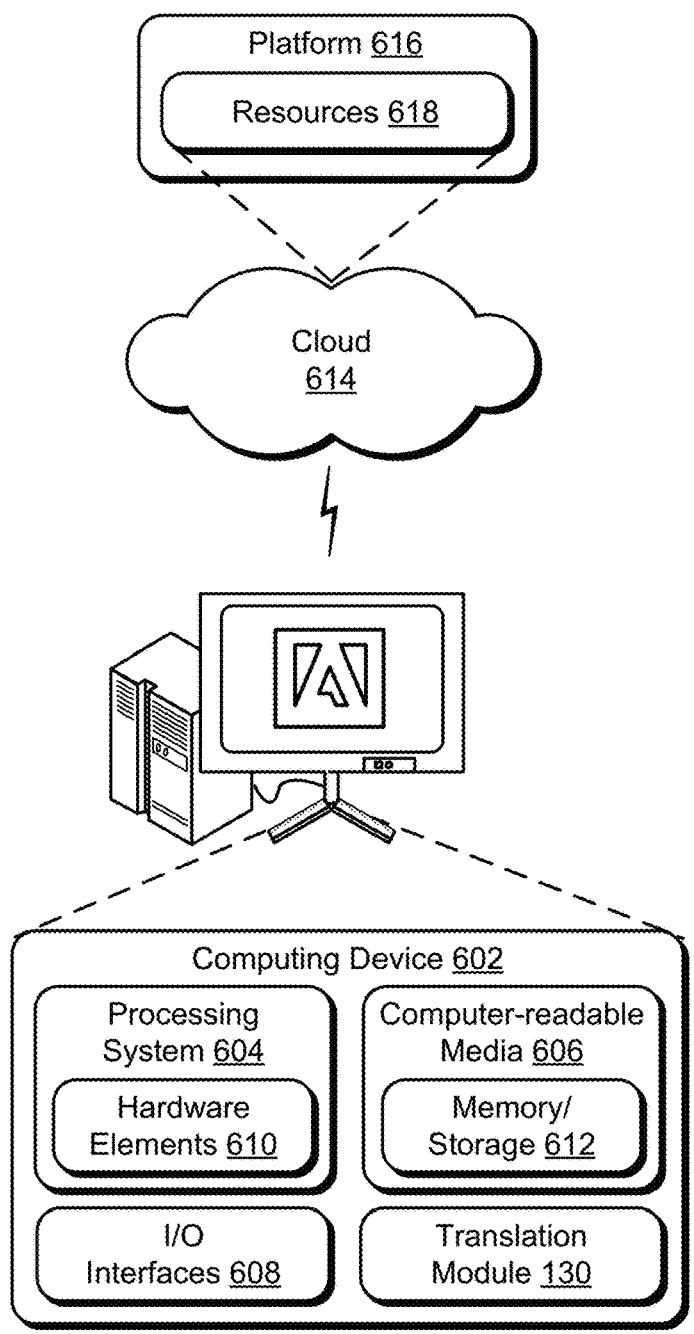
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that implement the various techniques described herein. This is illustrated through inclusion of the translation module 130. The computing device 602 is configurable, for example, as a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that is configurable as processors, functional blocks, and so forth. This includes implementation in hardware as an application specific integrated circuit or other logic device formed using one or more semiconductors. The hardware elements 610 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 606 is illustrated as including memory/storage 612. The memory/storage 612 represents memory/storage capacity associated with one or more computer-readable media. The memory/storage 612 includes volatile media (such as random access memory (RAM)) and/or nonvolatile media (such as read only memory (ROM), Flash memory, optical disks, magnetic disks, and so forth). The memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 610. The computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. This functionality is also implementable all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data that can be utilized while computer processing is executed on servers that are remote from the computing device 602. Resources 618 can also include services provided over the Internet and/or through a subscriber network, such as a cellular or Wi-Fi network.

The platform 616 abstracts resources and functions to connect the computing device 602 with other computing devices. The platform 616 also serves to abstract scaling of resources to provide a corresponding level of scale to encountered demand for the resources 618 that are implemented via the platform 616. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, contact area data describing an amount of contact detected at a surface of a touchscreen device;
translating, by the processing device, the contact area data into a pressure value defining an amount of pressure, the translating including using a counter to track a plurality of iterations and determining when the counter increases past a threshold number of iterations, at which the pressure value is set and prevented from further changes;
generating, by the processing device, an editing operation to edit a digital image based the amount of pressure defined by the pressure value; and
displaying, by the processing device using the touchscreen device, the digital image as having the editing operation applied.

2. The method as described in claim 1, wherein the translating includes identifying a bucket from a plurality of buckets, each said bucket mapping a respective interval of contact area values to a respective pressure value.

3. The method as described in claim 1, wherein the translating is performed for a plurality of instances of said contact area data over the plurality of iterations.

4. The method as described in claim 3, wherein the plurality of iterations are included as part of detecting a single continuous input at the surface of the touchscreen device.

5. The method as described in claim 3, wherein the translating includes a delta value to increase or decrease the pressure value responsive to a detected change in the contact area data between successive said iterations.

6. The method as described in claim 1, wherein the amount of contact is defined as a radius.

7. The method as described in claim 1, wherein the generating includes specifying a degree, to which, the editing operation is performed in generating the edit to the digital image based on the pressure value.

8. The method as described in claim 1, further comprising detecting whether the contact is performed using an active implement configured to generate pressure values directly using a pressure sensor disposed internal to the active implement or an inactive implement that is not configured to generate pressure values; and
wherein the receiving is performed responsive to the detecting the contact is performed using the inactive implement.

9. The method as described in claim 8, wherein the inactive implement is part of a human body.

10. The method of claim 1, wherein translating the contact area data includes using a delta value to smooth changes to the pressure value over a plurality of iterations.

11. The method of claim 10, wherein the delta value specifies an additional amount of pressure added to the pressure value as a change in the contact area data is detected.

12. A system comprising:
a sensor;
a memory component; and
a processing device coupled to the memory component, the processing device to perform operations comprising:
receiving a plurality of instances of contact area data describing an amount of contact detected by the sensor over a plurality of iterations, respectively;
translating the plurality of instances of the contact area data, respectively, into a plurality of pressure values defining respective amounts of pressure, the translating including identifying a bucket from a plurality of buckets, at least one said bucket mapping a respective interval of contact area values to a respective pressure value, the translating including using a counter to track a plurality of iterations and determining when the counter increases past a threshold number of iterations, at which the pressure value is set and prevented from further changes;
outputting the plurality of pressure values; and
generating an editing operation to edit a digital image based the plurality of pressure values and displaying the digital image as having the editing operation applied.

13. The system of claim 12, wherein the translating includes using a delta value to control transitions between the plurality of buckets through the plurality of iterations.

14. The system of claim 12, the operations further comprising detecting whether the contact is performed using an active implement configured to generate pressure values directly using a pressure sensor disposed internal to the active implement or an inactive implement that is not configured to generate pressure values; and wherein the receiving is performed responsive to the detecting the contact is performed using the inactive implement.

15. The system of claim 12, wherein translating the plurality of instances of the contact area data includes using a delta value to change the respective pressure value of the at least one said bucket between successive iterations of the plurality of iterations.

16. One or more computer-readable storage media storing instructions that, responsive to execution by a processor, causes the processor to perform operations including:

generating contact area data describing an amount of contact detected at a surface by a sensor;

translating the contact area data into a pressure value defining an amount of pressure, the translating including using a counter to track a plurality of iterations and determining when the counter increases past a threshold number of iterations, at which the pressure value is set and prevented from further changes;

generating an editing operation to edit a digital image based the amount of pressure defined by the pressure value; and displaying the digital image as having the editing operation applied.

17. The one or more computer-readable storage media as described in claim 16, the translating including identifying a bucket from a plurality of buckets, each said bucket mapping a respective interval of contact area values to a respective pressure value.

18. The one or more computer-readable storage media as described in claim 16, the translating further comprising a delta value used to change the pressure value between successive instances of a plurality of instances of the contact area data.

19. The one or more computer-readable storage media as described in claim 16, the operations further comprising detecting whether the contact is performed using an active implement configured to generate pressure values directly using a pressure sensor or an inactive implement that is not configured to generate pressure values.

20. The one or more computer-readable storage media as described in claim 16, wherein translating the contact area data includes using a delta value to smooth changes to the pressure value over a plurality of iterations.

* * * * *